United States Patent
Barbee, III et al.

(10) Patent No.: US 12,493,732 B1
(45) Date of Patent: Dec. 9, 2025

(54) ADIABATIC QUANTUM-FLUX-PARAMETRON PLACEMENT

(71) Applicant: Synopsys, Inc., Mountain View, CA (US)

(72) Inventors: Troy W. Barbee, III, Sunnyvale, CA (US); Uzzal Kumar Bhaumik, Noida (IN)

(73) Assignee: SYNOPSYS, INC., Sunnyvale, CA (US)

(*) Notice: Subject to any disclaimer, the term of this patent is extended or adjusted under 35 U.S.C. 154(b) by 820 days.

(21) Appl. No.: 17/747,388

(22) Filed: May 18, 2022

(51) Int. Cl.
*G06F 30/392* (2020.01)
*G06F 30/398* (2020.01)
*G06N 10/20* (2022.01)
*G06N 10/40* (2022.01)

(52) U.S. Cl.
CPC .......... *G06F 30/392* (2020.01); *G06F 30/398* (2020.01); *G06N 10/20* (2022.01); *G06N 10/40* (2022.01)

(58) Field of Classification Search
CPC .... G06F 30/39; G06F 30/392; G06F 2119/12; G06F 30/33; G06F 30/3308; G06F 1/04; G06F 30/34; G06F 30/347; G06F 30/367; G06F 1/10; G06F 30/394; G06F 2119/06; G06F 30/30; H01L 2225/06544; H01L 25/50; H01L 2225/06541; H01L 2924/00; H01L 2924/0002
USPC .................................................. 716/118–125
See application file for complete search history.

(56) References Cited

U.S. PATENT DOCUMENTS

| | | | | |
|---|---|---|---|---|
| 2008/0216038 A1* | 9/2008 | Bose | ..................... | G06F 30/392 |
| | | | | 716/118 |
| 2009/0254874 A1* | 10/2009 | Bose | ....................... | G06F 30/39 |
| | | | | 716/113 |
| 2014/0103959 A1* | 4/2014 | Andreev | ............... | G06F 30/327 |
| | | | | 716/105 |

* cited by examiner

*Primary Examiner* — Binh C Tat
(74) *Attorney, Agent, or Firm* — Laxman Sahasrabuddhe; Park, Vaughan, Fleming & Dowler LLP

(57) ABSTRACT

Cells in a superconducting electronics (SCE) netlist may be levelized. The SCE may use multiple clock phases, and each level in the levelized SCE netlist may be associated with a clock phase. Buffers may be inserted in the SCE netlist so that output ports of the SCE netlist are associated with the same clock phase. A floorplan may be created for the SCE netlist. A placed SCE netlist may be generated based on the floorplan, where cells in each row of the placed SCE netlist may be clocked using the same clock phase.

20 Claims, 7 Drawing Sheets

ADIABATIC QUANTUM-FLUX-PARAMETRON PLACEMENT

GOVERNMENT LICENSE RIGHTS

This invention was made with United States (U.S.) government support under Contract No. W911NF-17-9-0001 awarded by the U.S. Intelligence Advanced Research Projects Activity (IARPA). The U.S. government has certain rights in the invention.

TECHNICAL FIELD

The present disclosure generally relates to an electronic design automation (EDA) system for superconducting electronics (SCE). More specifically, the present disclosure relates to a system and method for providing adiabatic quantum flux parametron (AQFP) placement.

BACKGROUND

An increasing demand for computing and storage capacity has fueled an increase in the size and complexity of integrated circuit (IC) designs. SCE is a technology that may help meet future computing and storage demands.

SUMMARY

Embodiments described herein feature techniques and systems for placing SCE circuit designs that use multiple clock phases. In some embodiments described herein, cells in an SCE netlist may be levelized. The SCE netlist may use multiple clock phases, and each level in the levelized SCE netlist may be associated with a clock phase. Buffers may be inserted in the SCE netlist so that output ports of the SCE netlist are associated with the same clock phase. A floorplan may be created for the SCE netlist. A placed SCE netlist may be generated based on the floorplan. Cells in each row of the placed SCE netlist may be clocked using the same clock phase.

In some embodiments described herein, a row count estimate and a column count estimate may be determined for the floorplan. Next, the floorplan may be created based on the row count estimate and the column count estimate. In some embodiments described herein, a path from an input port to an output port that passes through a maximum number of cells may be determined, and the number of cells in the path (or a number that is greater than the number of cells in the path) may be used as the row count estimate. In some embodiments described herein, a width of each row may be determined by summing the widths of cells belonging to each row, and a maximum width across all rows may be used to determine the column count estimate. In some embodiments described herein, the maximum width across all rows may be divided by a site width, and the ceiling of the resulting value may be used as the column count estimate.

In some embodiments described herein, row bound constraints and maximum net length constraints may be generated for placing the SCE netlist. Next, the SCE netlist may be placed in the floorplan using the row bound constraints and the maximum length constraints.

In some embodiments described herein, a first row may be selected that is desired to be split into multiple rows. Next, one or more rows may be added to the floorplan that are clocked using the same clock phase as the first row. A first row bound constraint may be generated for the first row, where the first row bound constraint includes placement regions corresponding to the first row and the one or more rows.

In some embodiments described herein, a first cell may be selected in the SCE netlist. A first maximum net length that the first cell can drive may be determined. Next, a first maximum net length constraint may be generated that restricts a length of a net connected to an output of the first cell to be less than the first maximum net length.

In some embodiments described herein, pin placement may be performed on the placed SCE netlist. Input ports may be restricted to be placed on a first edge of the floorplan, and output ports may be restricted to be placed on a second edge of the floorplan that is opposite the first edge. In some embodiments described herein, legalization may be performed on the placed SCE netlist.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

DETAILED DESCRIPTION

SCE generally refers to electronic circuits that may include active and passive components, and that are designed to be operated below a critical temperature, where at least some of the components exhibit superconducting behavior. SCE circuits may use Josephson junctions and may rely on quantum mechanical quantization of magnetic flux. A Josephson junction (JJ) may include two superconducting structures separated by a non-superconducting structure. In this disclosure, the non-superconducting structure that separates two superconducting structures may be referred to as a junction. In a JJ, the junction may support a current that may flow indefinitely without any voltage being applied across the junction.

Examples of superconducting materials that may be used to construct a superconducting structure include, but are not limited to, aluminum (Al), niobium (Nb), and lead (Pb). In some embodiments, a non-superconducting structure may be a thin insulating tunnel barrier that is made of aluminum/aluminum oxide (Al/AlOx). In other embodiments, a non-superconducting structure may be made of a conducting material, such as silver (Ag), copper (Cu), or gold (Au), that does not exhibit superconductivity at low temperatures. In yet other embodiments, a non-superconducting structure may be a multilayered structure that may include one or more magnetic, non-magnetic, insulating, conducting, or ferromagnetic layers. In some embodiments, the non-superconducting structure is made of a superconducting material that has defects (which may have been introduced into the superconducting material by using a suitable technique, e.g., an electron beam), which prevent superconductivity at low temperatures.

Some SCE circuits, such as AQFP circuits, use multiple clock phases. The term "clock phase" may refer to a clock signal that has a phase shift between 0° and 360° with respect to a base clock signal. For example, four clock phases may correspond to clock signals with 0°, 90°, 180°, and 270° phase shifts with respect to a base clock signal. Although some embodiments described herein are explained in the context of AQFP circuits, the embodiments may be generally applicable to any SCE circuit in which circuit elements are clocked using multiple clock phases.

Figure 1:
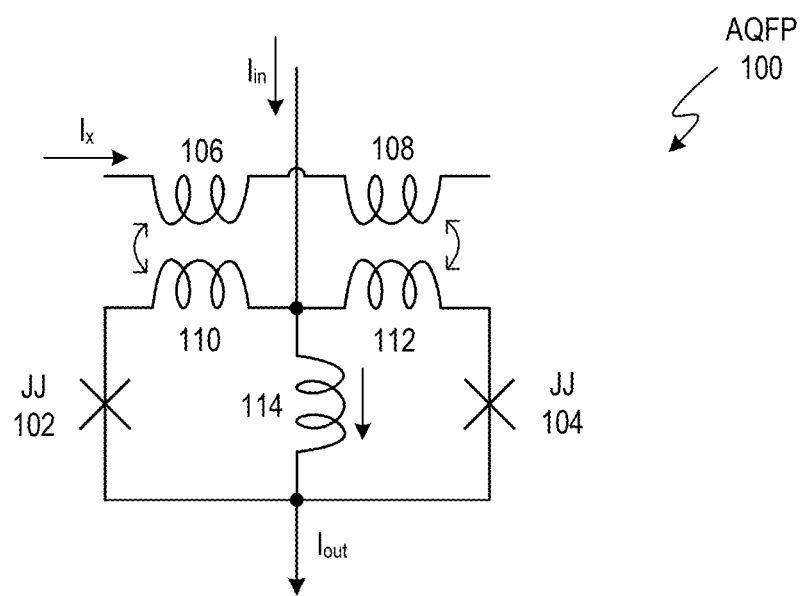
FIG. 1 illustrates an AQFP.

FIG. 1 illustrates an AQFP. AQFP 100 includes JJs 102 and 104, and superconducting inductors 106, 108, 110, 112, and 114. AQFP 100 includes (1) a right clockwise loop formed by superconducting inductors 114, 112, and JJ 104, and (2) a left anti-clockwise loop formed by superconducting inductors 114, 110, and JJ 102. When an external flux is applied to AQFP 100 by supplying an excitation current $I_x$, a current is induced in AQFP 100 such that the flux due to the induced current exactly cancels the applied external flux. Due to the phase matching condition required by the superconducting wave function, the flux due to the induced current can appear in the right clockwise loop or the left anti-clockwise loop, but not both. Therefore, AQFP 100 is bistable, and a small input current $I_{in}$ can determine which loop the flux appears in. When the excitation current $I_x$ is removed, all loop currents revert to zero. Superconducting inductors 106 and 110 are inductively coupled, and superconducting inductors 108 and 112 are inductively coupled. In FIG. 1, the input current, the output current, and the excitation current are denoted by $I_{in}$, $I_{out}$, and $I_x$, respectively.

An AQFP may be used as a building block to create SCE logic gates. AQFP-based logic gates are an energy efficient logic family of SCE, with an energy consumption of approximately $10^{-21}$ Joules per operation (which is many orders of magnitude less than the $10^{-14}$ Joules per operation energy consumption that is typical for complementary metal-oxide-semiconductor circuits). AQFP circuits are typically driven using multi-phase clocking, e.g., 4-phase clocking, to propagate logic state and improve throughput. Specifically, at least three phases may be required, where each pair of adjacent phases provides an overlap sufficient for activation, and the sequencing of the activation of the at least three phases causes state to propagate in a well-defined direction in the AQFP circuit. In these circuits, AQFP circuit elements that belong to consecutive phases are placed in consecutive rows.

The fact that different circuit elements in an SCE circuit use clock signals having specific clock phases may prevent complementary metal-oxide-semiconductor (CMOS) layout placement tools to be used for designing SCE circuits. Some embodiments described herein enable using CMOS placement tools for designing SCE circuits that use multi-phase clock signals, such as AQFP circuits. Advantages of embodiments described herein include, but are not limited to, avoiding costs associated with developing new placement tools for SCE circuits by adapting CMOS placement tools for placing SCE circuits.

In AQFP circuits, clocks may be delivered to the logic gates through a super conductive strip line. Specifically, all AQFP logic gates (including, but not limited to, AND gates, OR gates, NOT gates, and buffers) may be clocked. As the signal speed is constant, the maximum length of strip line may be constrained with respect to the achievable clock frequency. To increase the overall strip line length, multiple phases of the clock may be used.

Figure 2:
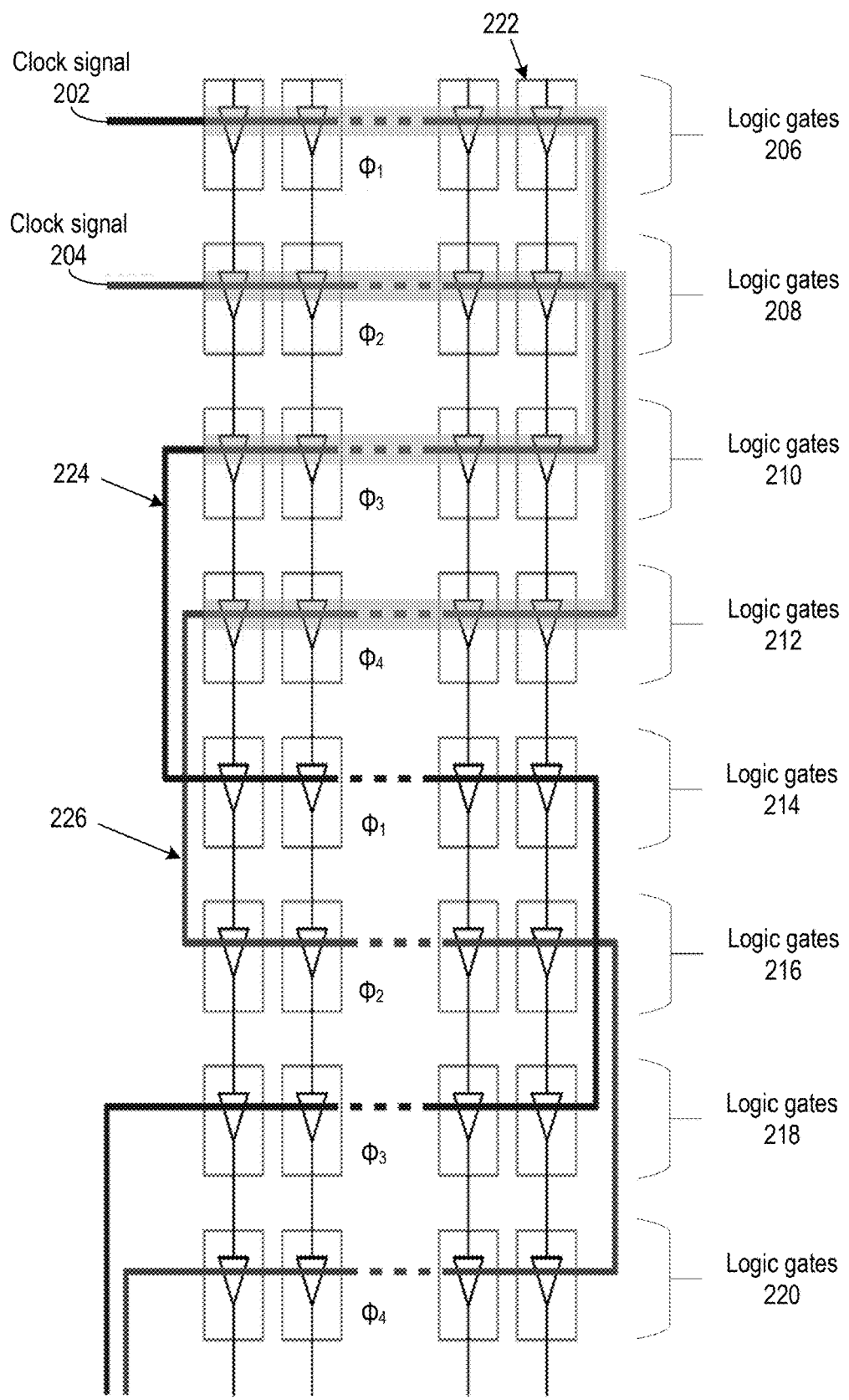
FIG. 2 illustrates providing clock signals having different phases to logic gates in an SCE circuit in accordance with some embodiments described herein.

FIG. 2 illustrates providing clock signals having different phases to logic gates in an SCE circuit in accordance with some embodiments described herein.

The SCE circuit shown in FIG. 2 may include logic gates 206, 208, 210, 212, 214, 216, 218, and 220. Logic gates 206 may be clocked using a clock signal having specific clock phase, e.g., phase $\phi_1$. Similarly, other logic gates may be clocked using other clock phases. Specifically, logic gates 208, 210, and 212 may be clocked using clock signals having clock phases $\phi_2$, $\phi_3$, and $\phi_4$, respectively. For example, $\phi_2=0°$, $\phi_2=90°$, $\phi_3=180°$, and $\phi_4=270°$. The sequence of clock phases may then be repeated, e.g., logic gates 214, 216, 218, and 220, may be clocked using clock signals having clock phases $\phi_1$, $\phi_2$, $\phi_3$, and $\phi_4$, respectively.

Clock signal 202 may be distributed to the logic gates using superconductive strip line 224, and clock signal 204 may be distributed to the logic gates using superconductive strip line 226. Clock signal 204 may be an inverted version of clock signal 202, i.e., clock signal 204 may have a 180° phase shift with respect to clock signal 202. Clock signal 202 may experience delay as the clock signal propagates through the superconductive strip line 224. Thus, clock phase $\phi_1$ is provided to logic gates 206 and 214, and clock phase $\phi_3$ is provided to logic gates 210 and 218.

Clock signal 204 may experience delay as the clock signal propagates through the superconductive strip line 226. Thus, clock phase $\phi_2$ is provided to logic gates 208, and clock phase $\phi_4$ is provided to logic gates 212. In other embodiments, more clock signals may be used.

Placement of logic gates in the presence of multiple clock phases may be performed as follows. First, for a given logic gate, a placement tool may need to ensure that the logic gate receives a clock signal before a clock signal is provided to the fanout logic gates. In other words, the clock phase that is provided to the fanout logic gates may need to be a delayed version of the clock phase that is provided to the given logic gate. For example, for logic gates 206, the fanout logic gates are logic gates 208. Thus, the clock phase ($\phi_2$) that is provided to logic gates 208 may be a delayed version of the clock phase ($\phi_1$) that is provided to logic gates 206.

In some embodiments described herein, the placement tool may place the logic gates in levelized manner. The placement tool may ensure that logic gates in the same level are driven by the same clock phase. For example, in FIG. 2, logic gates 206 may belong to the same level and may be driven by clock phase $\phi_1$, logic gates 208 may belong to the same level and may be driven by clock phase $\phi_2$, and so forth.

A logic gate may have one or more fanin logic gates and fanout logic gates that belong to different levels. Thus, some embodiments described herein may place the levelized logic gates in a manner that ensures the correct clock phase is provided to each level of logic gates. Moreover, a logic gate may have a maximum net length that the logic gate can drive. If this constraint is violated, the placement tool may need to insert buffers in the net. However, adding a buffer (which is also clocked) to the output net may change the level of the fanout cone, which may cause the clock phase that is provided to the fanout cone to be changed. In other words, adding a buffer in a net may change the clock phase of logic gates that are in the fanout cone of the buffer.

Figure 3:
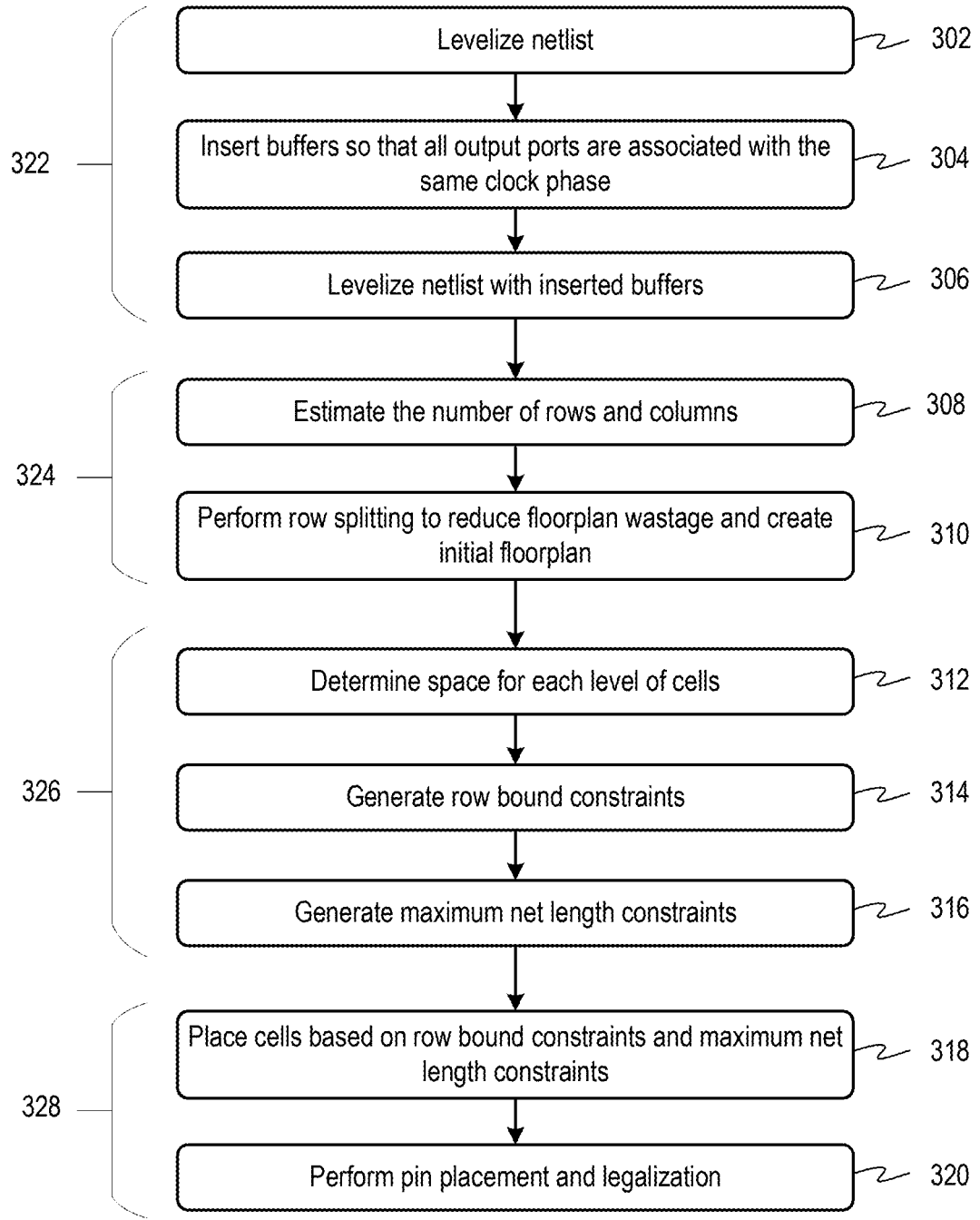
FIG. 3 illustrates a process for placing an SCE circuit in accordance with some embodiments described herein.

FIG. 3 illustrates a process for placing an SCE circuit in accordance with some embodiments described herein.

The SCE design may be levelized so that all output ports are at the same level (at 322). Specifically, the netlist may be levelized (at 302) by assigning the input ports of the SCE circuit a first level value (e.g., zero), and assigning a level to each gate that is greater than the maximum level of the fanin circuit elements. For example, the netlist may be traversed starting from the input ports using a breadth first search (BFS), and the gates that are reached in each iteration of the BFS may be assigned a level that is equal to the iteration number. The output ports may have different levels.

Figure 4A:
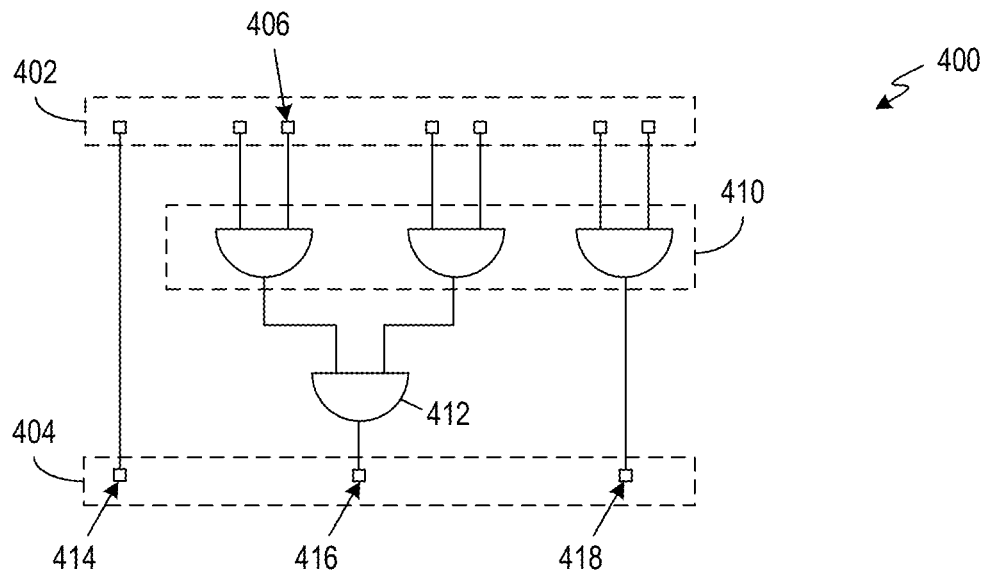
FIG. 4A illustrates assigning levels in an SCE circuit in accordance with some embodiments described herein.

FIG. 4A illustrates assigning levels in an SCE circuit in accordance with some embodiments described herein.

SCE circuit 400 shown in FIG. 4A includes input ports 402, output ports 404, gates 410 and gate 412. Input ports 402 may be assigned level 0. Next, BFS may be performed from input ports 402 and terminated once all output ports 404 are reached. In each BFS iteration, the level may be incremented and assigned to the circuit elements that are explored in the iteration. For example, gates 410 and output port 414 may be assigned level 1, gate 412 and output port 418 may be assigned level 2, and output port 416 may be assigned level 3. In FIG. 4A, the output ports have different levels and may be associated with different clock phases.

Next, buffers may be inserted so the output ports are associated with the same clock phase (at 304). Specifically, the maximum level among the output ports may be determined. A path from an input port to this output port with the maximum level is the longest path in the SCE circuit, i.e., this path has the greatest number of gates. For example, in FIG. 4A, a path from input port 406 to output port 416 is a longest path in SCE circuit 400. Gates in a given level are clocked by the same clock phase, and the output ports are desired to be in the same clock phase level. Thus, buffers may be inserted in shorter paths so that all output ports are associated with the same clock phase. In other words, the number of buffers added to a given path may be equal to the difference between the clock phase at the output port of the maximum length path and the clock phase at the output port of the given path.

For example, suppose an SCE circuit uses four clock phases. Then, levels 1, 5, 9, and 13 use the same clock phase, levels 2, 6, 10, and 14 use the same clock phase, levels 3, 7, 11, and 15 use the same clock phase, and levels 4, 8, 12, and 16 use the same clock phase. Suppose the output port of the maximum length path is at level 13, and the output port of a given path is at level 7. Thus, two buffers may be added to the given path so that the output port is at level 9, which uses the same clock phase as the level of the output port of the maximum length path, i.e., level 13.

Figure 4B:
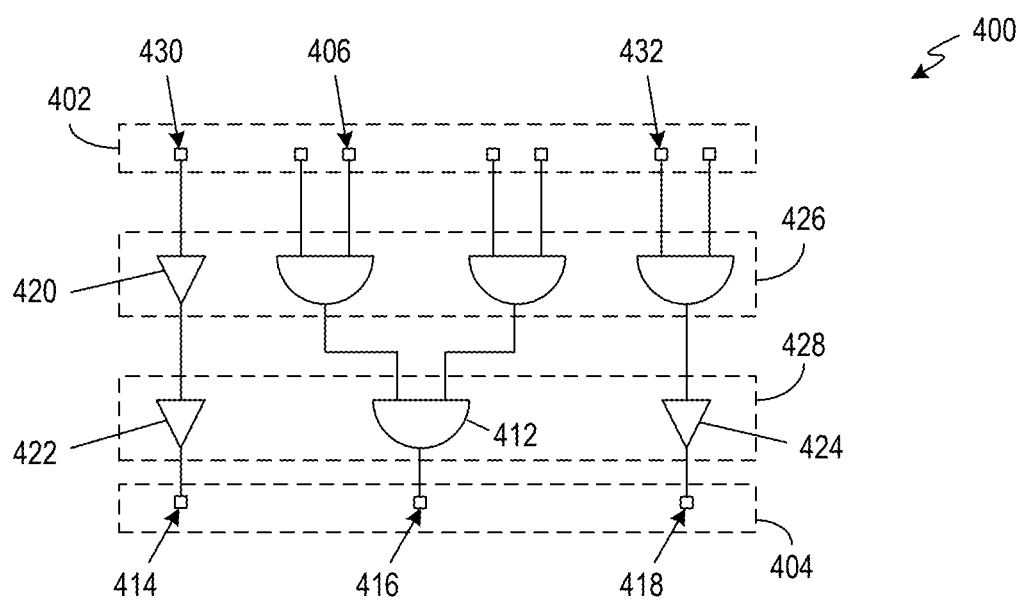
FIG. 4B illustrates inserting buffers so that all output ports are associated with the same clock phase in accordance with some embodiments described herein.

FIG. 4B illustrates inserting buffers so that all output ports are associated with the same clock phase in accordance with some embodiments described herein.

Buffers 420, 422, and 424 may be inserted in SCE circuit 400 so that output ports 404 are associated with the same clock phase. Specifically, the path from input port 430 to output port 414 has a length of 0 because the path does not pass through any gates. However, the maximum length path from input port 406 to output port 416 has a length of 2 because the path passes through two gates. Thus, the number of buffers inserted into the path from input port 430 to output port 414 is equal to 2, which is the difference between the length of the maximum path (i.e., 2) and the length of the path from input port 430 to output port 414 (i.e., 0). Similarly, a single buffer (buffer 424) may be added to the path from input port 432 and output port 418. After inserting buffers 420, 422, and 424, output ports 414, 416, and 418 are at level 3, and thus are associated with the same clock phase.

Once buffers have been inserted to ensure that the output ports are clocked using the same clock phase, the circuit may be levelized again (at 306) to update the levels that were assigned to the gates in 302. Specifically, buffer 420 may be assigned level 1, buffer 422 may be assigned level 2, buffer 414 may be assigned level 2, and output ports 414 and 418 may be assigned level 3.

Next, an initial floorplan may be created (at 324). Specifically, the number of rows and columns that are used for placing the cells may be estimated (at 308). The number of rows may be estimated by determining the maximum number of levels between an input port and an output port. For example, in FIG. 4A, the maximum number of levels between input ports 402 and output ports 404 is two. Thus, the number of rows used for placing SCE 400 may be estimated as two.

The width for placing gates in each level may be determined, and the maximum width across all levels may be used to estimate the number of columns. For example, in FIG. 4B, there are four gates in level 1 and three gates in level 2. In this example, the width used for placing the four level 1 gates in a row may be determined and used for estimating the number of columns (this example assumes that the aggregate width of the four level 1 gates is greater than the aggregate width of the three level 2 gates). Specifically, the width used for placing the gates may be divided by a column width to estimate the number of columns.

If the rows have a large range of width values and the maximum width value is used to create the floorplan, then a large portion of the floorplan may be wasted (i.e., it may not be used for placing cells). Thus, in some embodiments described herein, row splitting may be performed to reduce floorplan wastage and an initial floorplan may be created (at 310). In row splitting, a wide row may be split into multiple narrower rows. Row splitting may increase the number of rows, decrease the number of columns, and reduce floorplan area wastage.

Row splitting may be aware of the cyclical nature of clock phases. For example, suppose an SCE circuit has 4 clock phases that are used to clock rows in a cyclical order. If row 1 is split, then cells in row 1 may be kept in row 1 or moved to rows 5, 9, 13, and so forth. Similarly, if row 2 is split, then cells in row 2 may be kept in row 2 or moved to rows 6, 10, 14, and so forth. In other words, in row splitting, a cell in a given row may be kept in the same row or moved to another row that is clocked using the same clock phase as the given row. In some embodiments described herein, the decision to move a cell may be based on reducing a given metric, which may include, but is not limited to, a timing slack or a wirelength.

Figure 5A:
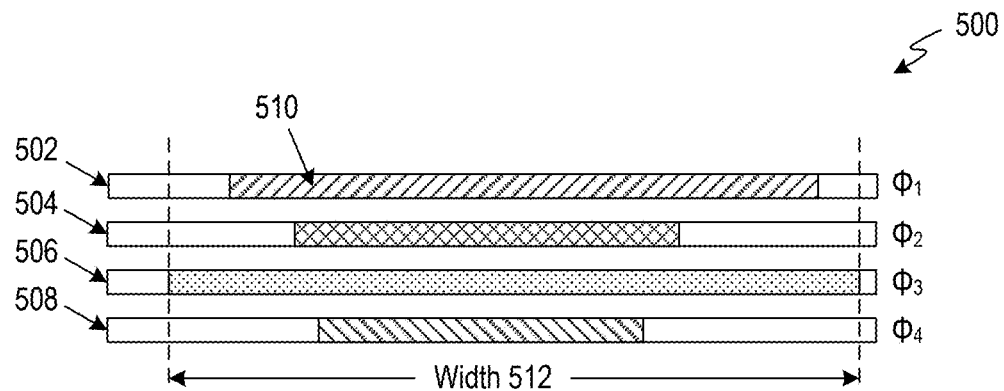
FIGS. 5A-5B illustrate row splitting in accordance with some embodiments described herein.
Figure 5B:
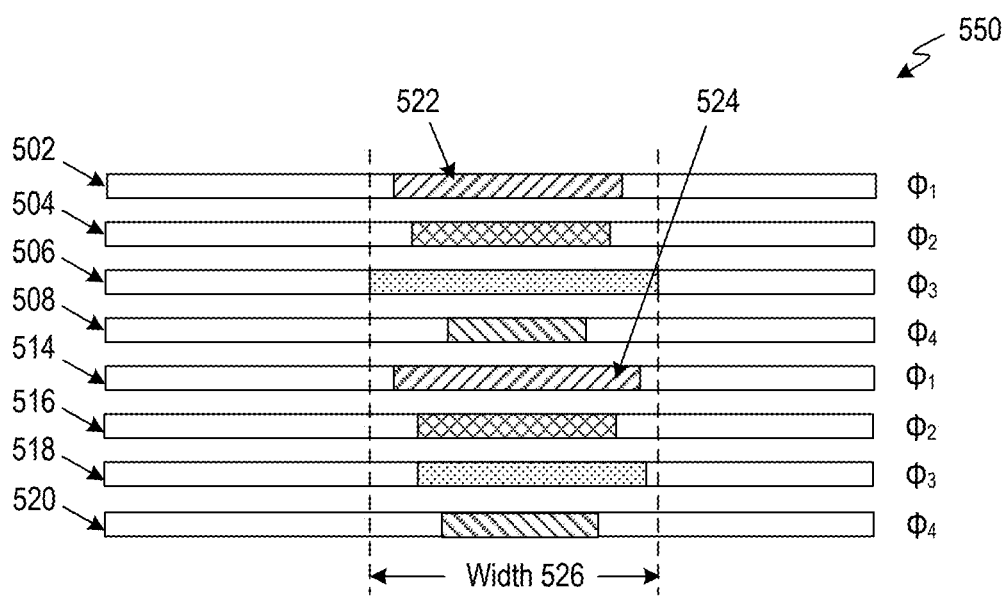

FIGS. 5A-5B illustrate row splitting in accordance with some embodiments described herein.

SCE floorplan 500 in FIG. 5A may include cell rows 502, 504, 506, and 508, which may be associated with clock phases $\phi_1$, $\phi_2$, $\phi_3$, and $\phi_4$, respectively. Each row may include a different number of cells, which when placed adjacent to each other may cover a certain width of the cell row. The shaded region in each row indicates the cells placed in the row. For example, cells 510 may be placed in row 502. The maximum width of a row across all rows in SCE floorplan 500 may be used as the width of the floorplan. For example, width 512 (which corresponds to the cells placed in row 506) may be used as the width of SCE floorplan 500. However, using this width may waste space. For example, a large amount of space in row 508 may be wasted if width 512 is used.

SCE floorplan 550 in FIG. 5B may be obtained by performing row splitting on SCE layout 500. Specifically, cell rows 514, 516, 518, and 520 may be added, which may be associated with clock phases $\phi_1$, $\phi_2$, $\phi_3$, and $\phi_4$, respectively. The cells in a row may be either placed in the same row or in one of newly added rows in FIG. 5B that is associated with the same clock phase. For example, cells 510 in row 502 in FIG. 5A may be placed either in rows 502 or 514 in FIG. 5B. Specifically, as shown in FIG. 5B, cells 522 have been placed in row 502 and cells 524 have been placed in row 514.

The maximum width of a row across all rows in SCE floorplan 550 may be less than the maximum width of a row across all rows in SCE floorplan 500. For example, width 526 may be less than width 512. Width 526 may be used as the width of SCE floorplan 550. Reducing the width of the floorplan may reduce wastage of floorplan space.

After each iteration of row splitting, the estimated floorplan utilization may be computed. The SCE technology may allocate space between rows for routing connections, which may be considered while computing the floorplan utilization. Row splitting may be performed iteratively until the floorplan area utilization is above a threshold and/or the floorplan area utilization does not improve sufficiently from one iteration to the next.

Once row splitting process terminates, the number of rows and columns may be determined. The user may also specify a floorplan utilization. Next, a floorplan may be created based on the estimated height and width of the floorplan (where the height and width of the floorplan are based on the number of rows and columns, respectively) and the user-specified floorplan utilization.

Referring to FIG. 3, a set of placement constraints may be generated (at 326). Specifically, space for each level of cells may be determined (at 312), and row bound constraints may be generated (at 314). After floorplan initialization, the physical space for each row is known and it is also known which cells belong to which row. In some embodiments described herein, each row is used for placing a set of cells that belong to the row. Thus, a move bound constraint may be created for these cells that restricts the placement of these cells within the physical space corresponding to the row.

If a row is split into multiple rows, then the move bound constraint covers all of the possible rows that were split from the original row. For example, row 502 in FIG. 5A is split into rows 502 and 514 in FIG. 5B. Thus, in FIG. 5B, a move bound constraint for the cells 510 may include a first rectangular region that includes row 502 and a second rectangular region that includes row 514. This move bound constraint ensures that a placer may place cells 510 either in row 502 or in row 514, but not in other rows. Thus, the move bound constraints may constrain the placer to place a cell in a row that is associated with the correct clock phase, i.e., the clock phase that is used for clocking the cell. The specific placement of the cells within a row may depend on reducing one or more metrics.

Next, maximum net length constraints may be generated (at 316). Each cell may have a different drive strength, which may limit the length of the superconducting strip line that the cell can drive. If a placed SCE circuit includes a cell that drives a superconducting strip line that is longer than the maximum length of superconducting strip line that the cell can drive, then a buffer may need to be added to the net. However, as explained above, adding a buffer in a net may cause many additional buffers to be added to other paths to ensure that all output ports are associated with the same clock phase. Thus, adding a buffer to a net may be highly undesirable in SCE circuits. In some embodiments described herein, a maximum net length placement constraint may be generated for each cell, which may instruct or force the placer to limit the length of the superconducting strip line driven by the cell to be less than the maximum net length specified in the constraint.

Placement may then be performed (at 328). Specifically, cells may be placed based on row bound constraints and maximum net length constraints (at 318). The placed SCE circuit may be checked for maximum net length constraint violations. If violations are detected, the floorplan of the SCE circuit may be adjusted. For example, one or more buffers may be added to the SCE circuit and/or one or more rows may be split. The adjusted floorplan of the SCE circuit may then be provided to the placer. Next, pin placement and legalization may be performed (at 320). In some embodiments described herein, input ports may be restricted to be placed on a first edge of the floorplan and output ports may be restricted to be placed on a second edge that is opposite the first edge of the floorplan. Legalization may then be performed, which may adjust cell locations to satisfy manufacturing rules and/or improve manufacturing yield. If legalization fails (e.g., does not meet a manufacturing rule requirement and/or a manufacturing yield requirement), the floorplan may be adjusted, and placement may be performed again.

Figure 6:
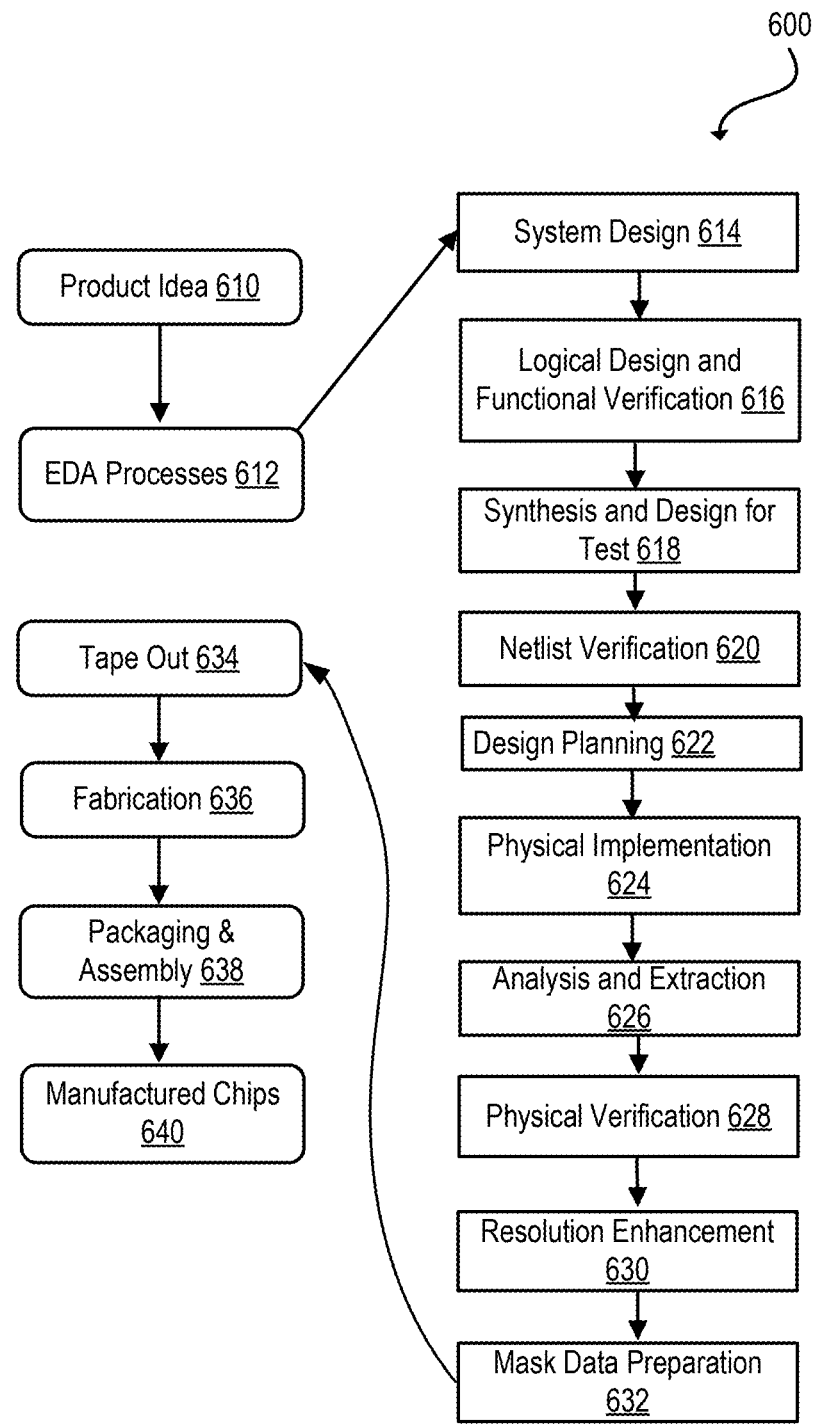
FIG. 6 illustrates an example flow for the design, verification, and fabrication of an integrated circuit in accordance with some embodiments described herein.

FIG. 6 illustrates an example flow 600 for the design, verification, and fabrication of an integrated circuit in accordance with some embodiments described herein. EDA processes 612 (the acronym "EDA" refers to "Electronic Design Automation") can be used to transform and verify design data and instructions that represent the integrated circuit. Each of these processes can be structured and enabled as multiple modules or operations.

Flow 600 can start with the creation of a product idea 610 with information supplied by a designer, information which is transformed and verified by using EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly 638 are performed to produce the manufactured IC chip 640.

Specifications for a circuit or electronic structure may range from low-level transistor material layouts to high-level description languages. A high-level of representation may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower representation level that is a more concrete description adds more detail into the design description. The lower levels of representation that are more concrete descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
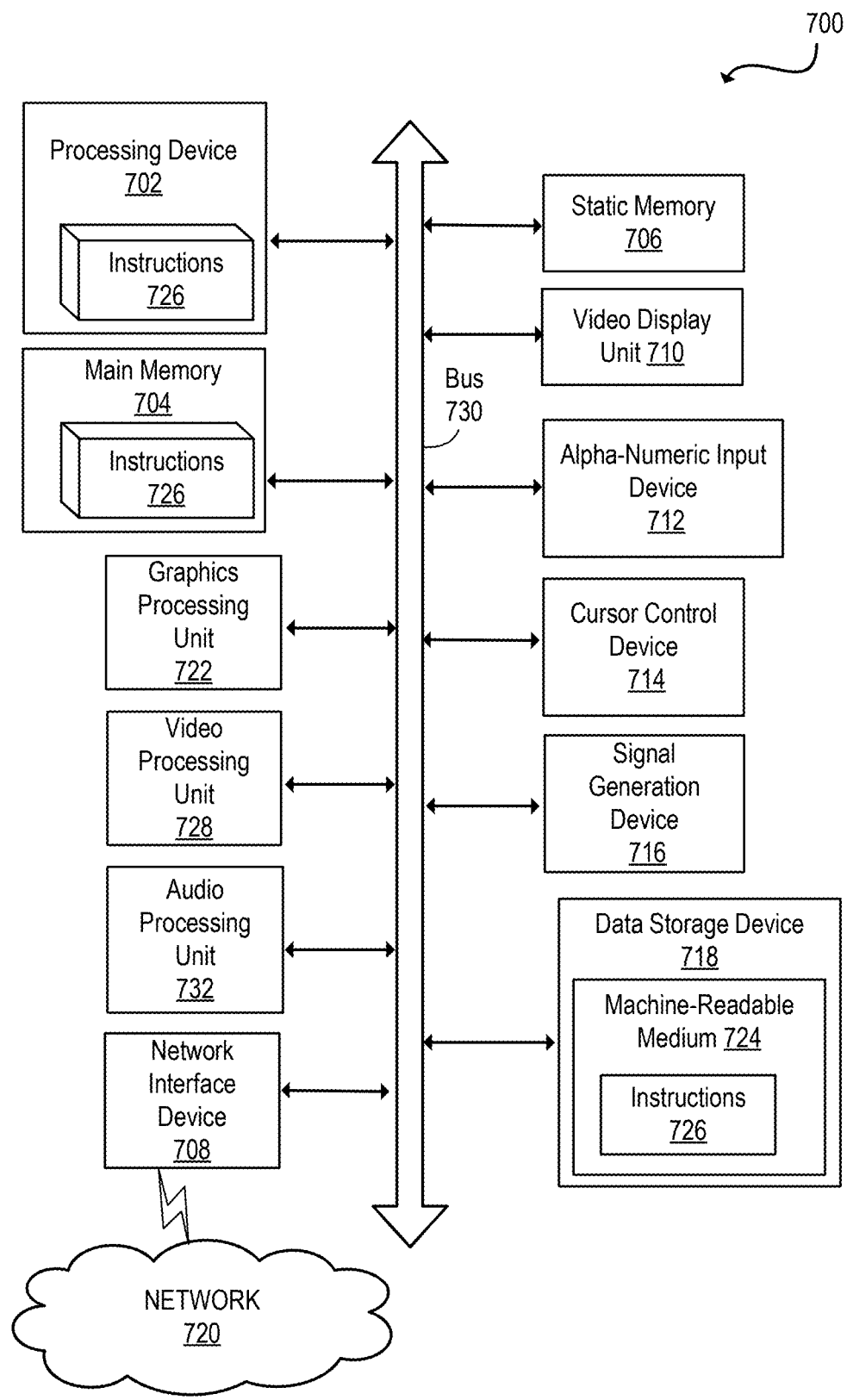
FIG. 7 illustrates an example machine of a computer system within which a set of instructions, for causing the machine to perform any one or more of the methodologies discussed herein, may be executed.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
levelizing cells in a superconducting electronics (SCE) netlist which uses multiple clock phases, wherein levelizing cells includes assigning a level to a cell based on a count of gates in a path from an input of the SCE netlist to the cell, and wherein each level is associated with a clock phase;
inserting buffers in the SCE netlist so that output ports of the SCE netlist are associated with the same clock phase;
creating a floorplan for the SCE netlist; and
generating, by a processor, a placed SCE netlist based on the floorplan, wherein cells in each row of the placed SCE netlist are clocked using the same clock phase.

2. The method of claim 1, wherein the creating the floorplan for the SCE netlist comprises:
determining a row count estimate and a column count estimate for the floorplan; and
creating the floorplan based on the row count estimate and the column count estimate.

3. The method of claim 2, wherein the determining the row count estimate and the column count estimate for the floorplan comprises:
determining a path from an input port to an output port that passes through a maximum number of cells; and
setting the row count estimate to be greater than or equal to the number of cells in the path.

4. The method of claim 2, wherein the determining the row count estimate and the column count estimate for the floorplan comprises:
selecting a first row that is desired to be split into multiple rows;
adding one or more rows to the floorplan that are clocked using the same clock phase as the first row; and
moving at least some cells from the first row to the one or more rows.

5. The method of claim 2, wherein the determining the row count estimate and the column count estimate for the floorplan comprises:
   determining a width of each row by summing the widths of cells belonging to the row; and
   determining the column count estimate based on a maximum width across all rows.

6. The method of claim 1, wherein the generating the placed SCE netlist based on the floorplan comprises:
   generating row bound constraints for placing the SCE netlist;
   generating maximum net length constraints for placing the SCE netlist; and
   placing the SCE netlist in the floorplan using the row bound constraints and the maximum length constraints.

7. The method of claim 6, wherein the generating the row bound constraints for placing the SCE netlist comprises:
   selecting a set of rows that are associated with a clock phase; and
   generating a first row bound constraint that includes placement regions corresponding to the set of rows.

8. The method of claim 6, wherein the generating the maximum net length constraints for placing the SCE netlist comprises:
   selecting a first cell in the SCE netlist;
   determining a first maximum net length that the first cell can drive; and
   generating a first maximum net length constraint that restricts a length of a net connected to an output of the first cell to be less than the first maximum net length.

9. The method of claim 1, further comprising:
   performing pin placement on the placed SCE netlist, wherein input ports are restricted to be placed on a first edge of the floorplan, and wherein output ports are restricted to be placed on a second edge of the floorplan that is opposite the first edge; and
   performing legalization on the placed SCE netlist.

10. A non-transitory computer readable storage medium storing instructions, which when executed by a processor, cause the processor to:
    levelize cells in a superconducting electronics (SCE) netlist which uses multiple clock phases, wherein levelizing cells includes assigning a level to a cell based on a count of gates in a path from an input of the SCE netlist to the cell, and wherein each level is associated with a clock phase;
    insert buffers in the SCE netlist so that output ports of the SCE netlist are associated with the same clock phase;
    determine a row count estimate and a column count estimate for a floorplan for the SCE netlist;
    create the floorplan based on the row count estimate and the column count estimate; and
    generate a placed SCE netlist based on the floorplan, wherein cells in each row of the placed SCE netlist are clocked using the same clock phase.

11. The non-transitory computer readable storage medium of claim 10, wherein the determining the row count estimate and the column count estimate for the floorplan comprises:
    determining a path from an input port to an output port that passes through a maximum number of cells; and
    setting the row count estimate to be greater than or equal to the number of cells in the path.

12. The non-transitory computer readable storage medium of claim 10, wherein the determining the row count estimate and the column count estimate for the floorplan comprises:
    selecting a first row that is desired to be split into multiple rows;
    adding one or more rows to the floorplan that are clocked using the same clock phase as the first row; and
    moving at least some cells from the first row to the one or more rows.

13. The non-transitory computer readable storage medium of claim 10, wherein the determining the row count estimate and the column count estimate for the floorplan comprises:
    determining a width of each row by summing the widths of cells belonging to the row; and
    determining the column count estimate based on a maximum width across all rows.

14. The non-transitory computer readable storage medium of claim 10, wherein the generating the placed SCE netlist based on the floorplan comprises:
    generating row bound constraints for placing the SCE netlist;
    generating maximum net length constraints for placing the SCE netlist; and
    placing the SCE netlist in the floorplan using the row bound constraints and the maximum length constraints.

15. The non-transitory computer readable storage medium of claim 14, wherein the generating the row bound constraints for placing the SCE netlist comprises:
    selecting a set of rows that are associated with a clock phase; and
    generating a first row bound constraint that includes placement regions corresponding to the set of rows.

16. The non-transitory computer readable storage medium of claim 14, wherein the generating the maximum net length constraints for placing the SCE netlist comprises:
    selecting a first cell in the SCE netlist;
    determining a first maximum net length that the first cell can drive; and
    generating a first maximum net length constraint that restricts a length of a net connected to an output of the first cell to be less than the first maximum net length.

17. The non-transitory computer readable storage medium of claim 10, wherein the instructions, which when executed by the processor, cause the processor to:
    perform pin placement on the placed SCE netlist, wherein input ports are restricted to be placed on a first edge of the floorplan, and wherein output ports are restricted to be placed on a second edge of the floorplan that is opposite the first edge; and
    perform legalization on the placed SCE netlist.

18. An apparatus, comprising:
    a memory storing instructions; and
    a processor, coupled with the memory and to execute the instructions, the instructions when executed causing the processor to:
       levelize cells in a superconducting electronics (SCE) netlist which uses multiple clock phases, wherein levelizing cells includes assigning a level to a cell based on a count of gates in a path from an input of the SCE netlist to the cell, and wherein each level is associated with a clock phase;
       insert buffers in the SCE netlist so that output ports of the SCE netlist are associated with the same clock phase;
       determine a row count estimate and a column count estimate for a floorplan for the SCE netlist;
       create the floorplan based on the row count estimate and the column count estimate; and
       generate a placed SCE netlist based on the floorplan, wherein cells in each row of the placed SCE netlist are clocked using the same clock phase.

19. The apparatus of claim 18, wherein the determining the row count estimate and the column count estimate for the floorplan comprises:
   selecting a first row that is desired to be split into multiple rows;
   adding one or more rows to the floorplan that are clocked using the same clock phase as the first row; and
   moving at least some cells from the first row to the one or more rows.

20. The apparatus of claim 18, wherein the generating the placed SCE netlist based on the floorplan comprises:
   generating row bound constraints for placing the SCE netlist;
   generating maximum net length constraints for placing the SCE netlist; and
   placing the SCE netlist in the floorplan using the row bound constraints and the maximum length constraints.

\* \* \* \* \*